United States Patent

Di Biasi et al.

[15] 3,668,179
[45] June 6, 1972

[54] COLOR STABILIZED POLYOLEFIN RESINS

[72] Inventors: Daniel J. Di Biasi, S. Plainfield; Albin J. Zilis, Jackson, both of N.J.

[73] Assignee: Mobil Oil Corporation

[22] Filed: Oct. 9, 1969

[21] Appl. No.: 865,174

[52] U.S. Cl. ...........................260/41 A, 260/45.85, 260/45.9
[51] Int. Cl. ..................C08f 45/10, C08f 45/58, C08f 45/60
[58] Field of Search ..................260/41 A, 45.7, 45.8, 45.8 N, 260/45.85, 45.9, 45.95

[56] References Cited

UNITED STATES PATENTS

| 3,180,848 | 4/1965 | Thompson | 260/41 |
| 3,454,525 | 7/1969 | Tholstrup | 260/45.85 |
| 3,494,947 | 2/1970 | Schultze et al | 260/481 |
| 3,496,128 | 2/1970 | Casey et al | 260/23 |

FOREIGN PATENTS OR APPLICATIONS 1,053,904   1/1967   Great Britain 661,701   11/1951   Great Britain

OTHER PUBLICATIONS

Kirk–Othmer, Ency. of Chem. Tech. Vol. 19, pp. 512, 519, 521 Interscience (1969).
Schwartz, Perry, Surface Active Agents, Vol. I, pp. 98, 100, 219, 220, Interscience, (1949).
Schwartz–Perry, Surface Active Agents, Vol. 1, pp. 307, 8 (Interscience, 1949).

*Primary Examiner*—Morris Liebman
*Assistant Examiner*—T. DeBenedictis, Jr.
*Attorney*—Oswald G. Hayes, Andrew L. Gaboriault and James F. Snowden

[57] ABSTRACT

The incorporation of certain surface active additives, as exemplified by bis(2-ethylhexyl) sodium sulfosuccinate, inhibits undesired coloration in polybutene-1 and other polyolefin resin compositions containing a color-forming phenolic stabilizing agent (e.g., 2,6-di-tert-butyl-o-cresol) which inhibits oxidative degradation of the resin.

9 Claims, No Drawings

COLOR STABILIZED POLYOLEFIN RESINS

BACKGROUND OF THE INVENTION

1. Field of the Invention

This invention relates to polyolefin resin compositions containing a surface active additive to inhibit discoloration of the resin resulting from the presence of color-forming agents in the resinous compositions.

2. Prior Art

The fabricators of plastic products and articles usually purchase synthetic resins or polymers which contain very small proportions of various additives that serve to resist or prevent certain undesirable changes in the resins or in the resulting articles. Thus, resins may contain plasticizers to prevent brittleness or cracking, inhibitors against degradation by ultra violet light, flame retardant agents, stabilizing agents to minimize oxidative degradation at elevated temperatures during processing or prolonged exposure to the atmosphere, additives that increase heat resistance, etc.

The fabricator prepares resinous compositions suitable for the production of products and articles by mixing such inhibited or stabilized resins with solid filler materials that are commonly in the form of the fine powders or loose or chopped fibers to facilitate their dispersion in the resin by means of suitable mixing or milling apparatus. One or more of such fillers may be dispersed in a resinous composition for various purposes including pigments to produce a specific controlled color, fibers for decorating or reinforcing the composition and extenders to reduce the cost of the resinous compositions and/or enhance its physical properties. Articles or products are then manufactured from the filled resinous compositions by suitable fabricating techniques, such as molding, casting, extrusion, or calendering.

Almost invariably, the fabricator prefers a light colored resin (i.e., water-white or of a light neutral hue) for compounding, even when manufacturing dark colored articles. Any tendency for a synthetic resin to become discolored or change color during lengthy storage, compounding, fabricating at elevated temperatures or during prolonged use or storage of the final product impairs the value of the resin, especially since it is then difficult or impossible to obtain controlled and permanent hues with standard colorants and to match colors. Nevertheless, such discoloration is encountered on occasion and its cause is often obscure.

It has been found that polyolefin resins containing small amounts of certain phenolic compounds, including substituted cresols that are highly effective as oxidation inhibitors, are prone to discoloration, particularly when various filling agents are incorporated into the resin composition. In the aforesaid stabilized polyolefins, various grades of asbestos fibers produce a highly undesirable color that may range from blue through purple to violet, and other filling agents may produce other colors, as exemplified by a brown coloration in the case of certain clays and a yellowish tinge in some instances with calcium carbonate. While the cause of such color development is not known, there is reason to believe that it may result from chemical reactions involving some of the heavy metals, particularly iron, which are often present as impurities in many of the fillers. Discoloration may sometimes be minimized or eliminated by employing fillers of higher purity in the resin compositions, but this involves extra expense and may impose additional quality control problems. It has now been discovered that such discoloration of stabilized polyolefin resins can usually be eliminated, or at least minimized by incorporation of certain surface active agents in minor amounts in the resin compositions.

SUMMARY OF THE INVENTION

The present invention relates to polyolefin resin compositions containing a color-forming (or potentially color-forming) phenolic stabilizer against oxidative degradation and a surfactant to inhibit discoloration.

Other aspects of the invention relate to designated classes of surfactants as exemplified by the salts of esters of sulfonated aliphatic carboxylic acids and particularly the preferred bis(2-ethylhexyl) sodium sulfosuccinate; a preferred phenolic antioxidant, namely, 2,6-di-tert-butyl-p-cresol; polybutene-1 as the preferred polyolefin and resin compositions containing filling agents, as particularly exemplified by asbestos fibers.

DESCRIPTION OF SPECIFIC EMBODIMENTS OF THE INVENTION

The polymer constituents of the present compositions may be homopolymers of ethylene, propylene or butene-1 as well as copolymers of any two or all three of the monomers. Either high or low density polyethylene is suitable, and the preparation of both types is well known. When the resinous material is to be employed as a binder in floor tile and like compositions, a stereoregular polypropylene or polybutene-1 is often preferred and these may be prepared according to procedures that have been extensively described in the art using stereospecific catalyst systems, such as titanium trichloride and diethylaluminum chloride. Examples of copolymers are those obtained by copolymerizing mixtures of 1 to 30 percent by weight of ethylene and 70–99 percent of butene-1 using one of the stereospecific polymerization catalysts and the procedure described in U.S. Pat. No. 3,362,940. The resulting copolymer contains lengthy sequences of butene-1 and random but shorter methylene sequences.

In addition to any desirable conventional additives, the new resin compositions contain an oxidation inhibitor as well as agent to prevent or minimize discoloration. Oxidative deterioration is effectively resisted by a phenolic stabilizer, such as 2,6-di-tert-butyl-p-cresol and like compounds, which may be incorporated in an amount ranging from about 0.01 to 1 percent based on the weight of the polyolefin, and an amount between about 0.02 and 0.10 percent is usually preferred. Although, such phenolic compounds are efficient for that purpose, they unfortunately have a pronounced tendency to promote discoloration in the resinous material; however this tendency can be effectively counteracted by including one or more color-inhibiting surface active agents in the polyolefin resin compositions. Many surfactants do not produce the desired result.

A particularly effective class of wetting agents or surface active substances which may be employed here are the well known salts of esters of sulfonated aliphatic dicarboxylic acids described in U.S. Pat. Nos. 2,028,091 and 2,176,423; which patents are incorporated here by reference. These compounds may be represented by the type formula:

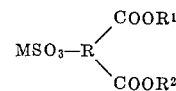

where R is an aliphatic carbon chain containing from two to 10 or more carbon atoms; $R^1$ and $R^2$ each represents an alkyl, aryl, alkaryl, aralkyl or alkoxyalkyl radical containing from three to 24 carbon atoms, and M designates an alkali metal, alkaline earth metal, a hydrogen atom, ammonium ion, or amino or alkanolamino radical. Thus while sodium and potassium salts are generally preferred, the salt may be derived from ammonia, triethanolamine, methyl or ethylamines (primary, secondary or tertiary), calcium or barium compounds to name only a few. Excellent results are obtainable with dialkyl sulfosuccinate salts of alkali metals, as particularly exemplified by bis(2-ethylhexyl) sodium sulfosuccinate. A few of the many other suitable substances of this type include the calcium salt of diamyl sulfosuccinate, dilauryl potassium sulfosuccinate, diphenyl sodium sulfopyrotartrate, dibutyl sodium sulfosebacate, dibenzyl sodium sulfoadipate and sodium glycerol sulfosuccinate. A surface active agent of this class may be employed in a color-inhibiting amount ranging from at least about 0.1 to 15 percent or more (calculated on an undiluted basis), and preferably between about 0.5 and 10 percent, based on the weight of the polyolefin resin. In some instances, large proportions of the surfactant may produce a plasticizing effect on the polymeric component which may be undesirable in certain applications.

Another group of suitable surfactants for the purpose comprises taurine derivatives, as exemplified by the N-hydrocarbyl-N-acyl taurate salts, and these may be defined by the type formula:

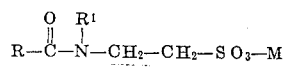

where R is an alkyl, cycloalkyl or unsaturated aliphatic radical containing from about seven to 31 carbon atoms, $R^1$ is a monovalent alkyl, cycloalkyl or aryl radical containing from one to 12 carbon atoms, and M is an alkali metal or alkaline earth metal. Among the many suitable agents of this class are sodium N-methyl-N-oleoyl taurate, sodium N-methyl-N-"coconut oil acid" taurate, sodium N-methyl-N-"tall oil acid" taurate, sodium N-cyclohexyl-N-palmitoyl taurate, sodium N-methyl-N-palmitoyl taurate and sodium N-methyl-N-"tallow acid" taurate as well as the corresponding potassium, lithium and calcium salts. Such surface active agents may be employed in an amount ranging between about 0.2 and 25 percent (undiluted basis) by weight of the polyolefin, and the range of about 1 to 15 percent is usually preferred.

Another suitable type of surface active agents for minimizing discoloration in polyolefin resins are the alkyl betaines. Good results are obtainable with cetyl betaine but the alkyl substituent may have a carbon content ranging from eight to 32 carbon atoms. This agent may be introduced into the resin in quantities between about 0.2 and 25 percent (undiluted basis), and preferably between about 1 and 15 percent, by weight of the polyolefin.

For the fabrication of articles or products from the aforesaid inhibited and stabilized polyolefin resins, one or more solid additives, usually in the form of powder or short fibers, are incorporated into the resin for a number of purposes. These additives are essentially of an inert nature and they may be described as fillers or filling agents, which terms are employed here in a generic sense to include pigments for suitably coloring the compositions, reinforcing fibers and extenders which not only create bulk and thereby reduce the cost of the compositions but also in certain instances may increase the hardness and resistance of the compositions to indentation, heat, water and solvents.

Among the examples of extenders that are utilizable are graphite, diatomaceous earth, clays, quartz, sand, metal powder, metal oxides, gypsum, calcium carbonate and the like, wood flour, marble flour, sawdust, mica, ground cork, wood pulp and walnut shell flour to name only a few.

Suitable pigments encompass inorganic or organic coloring materials that are insoluble in the resin and may include metal oxides and salts, azo compounds, nitro compounds, anthroquinones, and indigos. Typical pigments are lithopone, titanium dioxide, zinc oxide, burnt sienna, ferric oxide, red lead, raw umber, yellow ocher, lead chromate, chrome orange, chrome green and ultramarine blue, Pigment Chlorine GG, Lithol Fast Yellow GG, Toluidine Red R, O-Chloronitroaniline Red, Orange GG, Yellow R, Benzidine Yellow, Malachite Green, Methyl Violet B, Rhodamine B, Lake Red D, Naphthol Green B and Alizarin as well as other pigments known in the art.

For purposes of strengthening and reinforcing the resinous compositions and enhancing their dimensional stability and impact strength, fibrous fillers may be employed. Typical fibers that can be used are wood fibers, cotton fibers, glass fibers, hemp, asbestos, wood pulp, and synthetic fibers, such as nylon, terephthalate polyesters, acrylonitrile polymers, and copolymers and the like.

The total amount of such fillers in the form of extenders, pigments and fibers included in the resin compositions can vary greatly depending on the properties desired in the product and the selected method of fabrication, usually amounting to at least about 5 or 10 percent, and it is typically between about 60 and about 85 percent of the weight of a floor tile composition.

Asbestos fibers are particularly suitable reinforcements for compositions intended for use as floor tiles, but this material seems to have a tendency to react with the aforesaid phenolic stabilizing agent in the resin and discolor the mass. This effect seems to be especially pronounced in the case of the less expensive grades of asbestos. However the resulting blue or violet color is eliminated or at least minimized, when one of the aforesaid surface active agents is present. It may be theorized that a compound of iron (or perhaps another heavy metal) present as an impurity in the asbestos reacts with the phenolic stabilizer to form a highly colored complex compound, and that the surfactant tends to chelate with the iron and resist the initial formation of any such colored compounds or decompose any that may have already been formed. However, this speculation has not been confirmed; accordingly, the present invention should not be regarded as limited to any particular theory concerning its operation or effects.

It is not necessary to resort to special blending and processing techniques to produce uniform blends of the resins with the oxidation-inhibiting and the color-inhibiting agents and also in compounding resin compositions and fillers. The components are simply blended by masticating, for example, on a slightly warm differential-speed two-roll mill or in similar polymer blending machinery, such as a Banbury mill. The polymer components may be charged first, followed by blending in of the fibers, extenders and pigments, or all ingredients can be blended in one operation. The blend is then fabricated by conventional methods to form the desired article or product.

While specific examples of certain compositions of this invention are described hereinafter with particular reference to floor tiles, the resinous mixtures can also be calendered into sheets for covering tables, counter tops, and the like. Molded and extruded products may also be fabricated from compositions that generally contain different proportions or types of filling agents.

For a better understanding of the nature, benefit and advantages of this invention, reference should be had to the following illustrative examples which are not intended for purposes of limitation. Unless otherwise stated, all proportions are set forth in terms of weight.

EXAMPLE 1

A resinous floor tile composition is prepared by depositing the following materials at room temperature on a heated two-roll laboratory mill maintained at 260°–270° F. and compounding them into a uniform mass with the fibrous reinforcement and filler evenly distributed therethrough. The resin is an isotactic polybutene-1 with a melt index of substantially 20 grams/10 minutes, and it contains a phenolic stabilizer in the form of 0.05 percent of 2,6-di-tert-butyl-p-cresol to stabilize the resin against oxidative degradation during compounding and aging in use.

| | Grams |
|---|---|
| Stabilized polybutene-1 | 80 |
| Chrysotile asbestos—⅛–¼ inch length (coalinga AZ-20) | 40 |
| Calcium carbonate powder | 280 |
| Bis(2-ethylhexyl) sodium sulfosuccinate solution (75 weight % dissolved in 4.5% ethanol and 20.5% water) | 4 |

While compounding the first three ingredients, it is observed that a violet-purple color appears in the mass. Upon adding the solution of the sulfosuccinate surface active agents, this color disappears as soon as the surfactant is thoroughly mixed into the mass, and the final color of the reinforced resinous composition is a light neutral hue, beige with a gray tint. This material is suitable for controlled coloring by the addition of a wide variety of pigments or other colorants and for calendering into plastic floor tiles in the usual manner.

EXAMPLE 2

Example 1 is repeated with 4 grams of sodium N-methyl-N-oleoyl taurate flakes added as the final ingredient instead of the sulfosuccinate compound. Although there is a very considerable reduction in the purple coloration, it is evident that the quantity of this surfactant should be increased somewhat for the purple color to disappear completely.

EXAMPLE 3

Example 1 is again repeated with a different surface active agent in the form of cetyl betaine (C-type) as a 33 percent solution in water in the amount of 4 grams. A significant reduction in the undesired purple color is observed upon adding this agent, but a substantially larger content of this surfactant is indicated for complete elimination of the unwanted coloration.

EXAMPLE 4

The procedure of Example 1 is followed in preparing another floor tile composition using an isotatic polypropylene resin containing 0.10 percent of the same phenolic antioxidant and having a melt flow of 5. The resinous mass turns purple during compounding; however this color disappears upon addition of the sulfosuccinate surface active agent.

EXAMPLE 5

The procedure of Example 1 is followed in preparing another floor tile composition using a linear polyethylene resin (0.96 nominal density) containing 0.08 percent of the same phenolic stabilizer and having a melt index of 1. The resinous mass turns purple during compounding, but the addition of the sulfosuccinate component eliminates this color.

EXAMPLE 6

The procedure of Example 1 is adopted in compounding the materials listed hereinafter wherein titanium dioxide is incorporated as a pigment and the resin is a copolymer. This particular resin is a random copolymer of 8 mole percent ethylene and 92 mole percent polybutene-1. It has a content of 0.05 percent 2,6-di-tert-butyl-p-cresol and a melt index of 0.2–0.3 grams/10 minutes.

|  | Grams |
| --- | --- |
| Stabilized ethylene-butene copolymer | 120 |
| Chrysotile asbestos—⅛–¼ inch lengths (coalinga AZ-20) | 60 |
| Calcium carbonate powder | 384 |
| Titanium dioxide | 30 |
| Bis(2-ethylhexyl) sodium sulfosuccinate 75% aqueous solution of 4.5% ethanol content | 6 |

Again a violet-purple color appears while milling the first four components of the resinous mass, but this is quickly eliminated upon admixture of the sulfosuccinate surfactant.

EXAMPLE 7

Example 6 is repeated with a different resin in the form of a polybutene-1 having a melt index similar to that of the resin employed in Example 1 and a content of 0.075 of the phenolic stabilizer against oxidation. In this case also, the purple color disappears when the sulfosuccinate compound is thoroughly mixed into the material on the mill.

While the invention has been illustrated by means of a number of detailed examples employing the same extenders, pigments and fibrous reinforcements to provide valid comparisons, it will be apparent to those skilled in the art that the compositions of the present invention may be modified within its purview by the substitution of other filler materials, color-forming phenolic stabilizers and surface active compounds. Accordingly, the present invention should not be construed as limited in any particulars except as may be set forth in the appended claims or required by the prior art.

1. In a polyolefin resin composition of the group consisting essentially of homopolymers and copolymers of ethylene, propylene and butene-1, containing a color-forming phenolic stabilizer to inhibit oxidative degradation, the improvement which comprises the inclusion in said composition of a color-inhibiting quantity of a surfactant of the group consisting of alkyl betaines having alkyl groups containing from eight to 32 carbon atoms

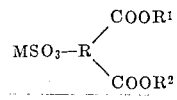

and taurate salts having the formula:

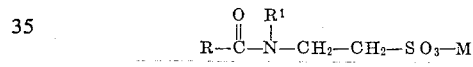

where R is an alkyl, cycloalkyl or unsaturated aliphatic radical containing from about seven to 31 carbon atoms, $R^1$ is a monovalent alkyl, cycloalkyl or aryl radical containing from one to 12 carbon atoms, and M is an alkali metal or alkaline earth metal.

2. A composition according to claim 1 which contains a filler having a normal tendency to react with said phenolic stabilizer and discolor polyolefin resin compositions.

3. A composition according to claim 1 which contains asbestos fibers.

4. A composition according to claim 1 in which said surfactant is an N-hydrocarbyl-N-acyl taurate salt.

5. A composition according to claim 1 in which said surfactant is sodium N-methyl-N-oleoyl taurate.

6. A composition according to claim 1 in which said polyolefin is polypropylene.

7. A composition according to claim 1 in which said resin is a copolymer of ethylene and butylene.

8. A composition according to claim 1 in which said polyolefin is polybutene-1.

9. A composition according to claim 1 in which said phenolic stabilizer is 2,6-di-tert-butyl-p-cresol.

* * * * *

PO-1050
(5/69)

UNITED STATES PATENT OFFICE
CERTIFICATE OF CORRECTION

Patent No. 3,668,179                              Dated    June 6, 1972

Inventor(s)    Daniel J. Di Biasi and Albin J. Zilis

It is certified that error appears in the above-identified patent and that said Letters Patent are hereby corrected as shown below:

Abstract, Column 2, line 18, change "di-tert-butyl-o-cresol" to --di-tert-butyl-p-cresol--

Column 6, lines 27-31, $MSO_3 \diagdown \genfrac{}{}{0pt}{}{COOR^1}{COOR^2}$   should be omitted.

Signed and sealed this 26th day of December 1972.

(SEAL)
Attest:

EDWARD M. FLETCHER, JR.                    ROBERT GOTTSCHALK
Attesting Officer                          Commissioner of Patents